(12) United States Patent
Kamimura et al.

(10) Patent No.: US 10,240,496 B2
(45) Date of Patent: Mar. 26, 2019

(54) ENGINE OIL SUPPLY APPARATUS

(71) Applicant: MAZDA MOTOR CORPORATION, Hiroshima (JP)

(72) Inventors: Keiichi Kamimura, Hiroshima (JP); Hirokazu Matsuura, Higashihiroshima (JP); Tomohiro Koguchi, Higashihiroshima (JP); Kenta Honda, Aki (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 445 days.

(21) Appl. No.: 15/022,797

(22) PCT Filed: Aug. 17, 2015

(86) PCT No.: PCT/JP2015/073028
§ 371 (c)(1),
(2) Date: Mar. 17, 2016

(87) PCT Pub. No.: WO2016/039078
PCT Pub. Date: Mar. 17, 2016

(65) Prior Publication Data
US 2016/0208663 A1   Jul. 21, 2016

(30) Foreign Application Priority Data
Sep. 11, 2014  (JP) .................. 2014-185495

(51) Int. Cl.
*F01M 1/16*  (2006.01)
*F01M 1/06*  (2006.01)
(Continued)

(52) U.S. Cl.
CPC ............ *F01M 1/16* (2013.01); *F01L 1/3442* (2013.01); *F01M 1/02* (2013.01); *F01M 1/06* (2013.01);
(Continued)

(58) Field of Classification Search
CPC .. F01M 1/16; F01M 1/02; F01M 1/06; F01M 1/08; F01M 9/10; F01M 2001/062;
(Continued)

(56) References Cited

U.S. PATENT DOCUMENTS

| | | | |
|---|---|---|---|
| 6,658,926 B2 * | 12/2003 | Mairhofer | G01M 13/04 73/114.42 |
| 7,484,484 B2 * | 2/2009 | Frincke | F01L 1/04 123/90.16 |
| 2011/0315106 A1 | 12/2011 | Noda et al. | |

FOREIGN PATENT DOCUMENTS

| | | |
|---|---|---|
| CN | 102312692 A | 1/2012 |
| DE | 10 2007 058 756 A1 | 9/2008 |

(Continued)

OTHER PUBLICATIONS

An Office Action issued by the Chinese Patent Office on Oct. 16, 2017, which corresponds to Chinese Patent Application No. 201580001961.7 and is related to U.S. Appl. No. 15/022,797; with English translation.
(Continued)

*Primary Examiner* — Hung Q Nguyen
(74) *Attorney, Agent, or Firm* — Studebaker & Brackett PC

(57) ABSTRACT

An oil supply apparatus includes: an oil pump; a main oil supply path; a sub oil supply path connected to the main oil supply path; a first oil supply section which is connected to the main oil supply path and which supplies oil to a crank bearing section of a specific crank journal; a second oil supply section which is connected to the sub oil supply path and which supplies oil to a crank bearing section of a crank journal other than the specific crank journal; and a control apparatus which sets, as a target oil pressure, a highest required oil pressure among required oil pressures required from a plurality of hydraulic operating sections in accor-
(Continued)

dance with an operation state of the engine, and which controls the discharge amount of the oil pump so that an oil pressure detected by an oil pressure sensor equals the target oil pressure.

6 Claims, 12 Drawing Sheets

(51) Int. Cl.
  *F01M 1/08* (2006.01)
  *F01M 9/10* (2006.01)
  *F01M 1/02* (2006.01)
  *F01L 1/344* (2006.01)
  *F01M 11/02* (2006.01)

(52) U.S. Cl.
  CPC .............. *F01M 1/08* (2013.01); *F01M 9/10* (2013.01); *F01L 2001/34423* (2013.01); *F01L 2810/02* (2013.01); *F01M 2001/062* (2013.01); *F01M 2011/023* (2013.01); *F16N 2280/00* (2013.01)

(58) Field of Classification Search
  CPC .............. F01M 2011/023; F01L 1/3442; F01L 2001/34423; F01L 2810/02; F16N 2280/00
  See application file for complete search history.

(56) References Cited

FOREIGN PATENT DOCUMENTS

| | | |
|---|---|---|
| JP | H10-082308 A | 3/1998 |
| JP | 2008-106701 A | 5/2008 |
| JP | 2012-117456 A | 6/2012 |
| JP | 2014-159757 A | 9/2014 |

OTHER PUBLICATIONS

International Search Report—PCT/JP2015/073028 dated Nov. 17, 2015.

An Office Action issued by the German Patent Office dated May 2, 2017, which corresponds to German Patent Application No. 11 2015 000 155.7 and is related to U.S. Appl. No. 15/022,797; with English language translation.

* cited by examiner

ENGINE OIL SUPPLY APPARATUS

TECHNICAL FIELD

The present invention relates to an engine oil supply apparatus which supplies oil to respective parts of an engine of an automobile or the like.

BACKGROUND ART

For example, Patent Literature 1 discloses an oil supply apparatus in which oil is introduced into a crank shaft from a specific crank journal among crank journals of the crank shaft and the oil is supplied to respective crank pins through an inside passage formed in the crank shaft. The oil supply apparatus is configured such that oil discharged from an oil pump is supplied to a crank bearing section which bears the specific crank journal (referred to as a specific crank journal) through a main oil path and, at the same time, oil is supplied to crank bearing sections which bear crank journals other than the specific crank journal through a branch oil path which branches from the main oil path. In addition, the oil supply apparatus is configured such that, by performing oil supply control with a flow rate control valve provided on the branch oil path and the like, oil supply amounts to the specific bearing section and to the other crank bearing sections are kept at appropriate amounts.

Generally, a required oil amount (required oil pressure) of oil differs depending on an operation state of an engine (rotational speed, load, oil temperature, and the like). This is due to the fact that oil amounts suitable for lubrication and cooling differ in accordance with the operation state of the engine and that activation and deactivation of hydraulic operating devices such as a variable valve timing mechanism must be switched depending on the operation state of the engine. In consideration thereof, according to Patent Literature 1 described above, a required oil amount (required oil pressure) of each crank bearing section can be appropriately secured by controlling the flow rate control valve provided on an oil path in accordance with the operation state of the engine.

However, as the required oil amount (required oil pressure) of oil changes in accordance with operation states of an engine, solely controlling a flow rate control valve often results in an oil pump operating in a wasteful manner as a whole and creating drive loss even if a required oil amount (required oil pressure) is satisfied. Therefore, there is room for improvement in this regard.

CITATION LIST

Patent Literature

Patent Literature 1: Japanese Unexamined Patent Publication No. 2012-117456

SUMMARY OF INVENTION

An object of the present invention is to supply oil to a journal (crank journal) and a crank pin of a crank shaft in an appropriate manner while suppressing drive loss of an oil pump.

In addition, the present invention is an engine oil supply apparatus which is provided with a crank shaft including a plurality of crank journals and in which oil is introduced inside of the crank shaft from a specific crank journal from among the plurality of crank journals and the oil is supplied to a crank pin through an inside passage formed in the crank shaft, the oil supply apparatus including: an oil pump which is capable of controlling a discharge amount; a main oil supply path into which oil discharged from the oil pump is introduced; a sub oil supply path which is connected to a downstream side of the main oil supply path in an oil flow direction; a first oil supply section which is connected to the main oil supply path and which supplies oil to a crank bearing section of the specific crank journal from among the plurality of crank journals; a second oil supply section which is connected to the sub oil supply path and which supplies oil to a crank bearing section of the crank journal other than the specific crank journal; a plurality of hydraulic operating sections which include at least the first oil supply section and the second oil supply section; an oil pressure sensor which detects an oil pressure of the main oil supply path; and a control apparatus which sets, as a target oil pressure, a highest required oil pressure among required oil pressures required from the plurality of hydraulic operating sections in accordance with an operation state of the engine, and which controls the discharge amount of the oil pump so that the oil pressure detected by the oil pressure sensor equals the target oil pressure.

DESCRIPTION OF EMBODIMENTS

Hereinafter, a preferred embodiment of the present invention will be described in detail with reference to the accompanying drawings.

<Configuration of Engine>

Figure 1:
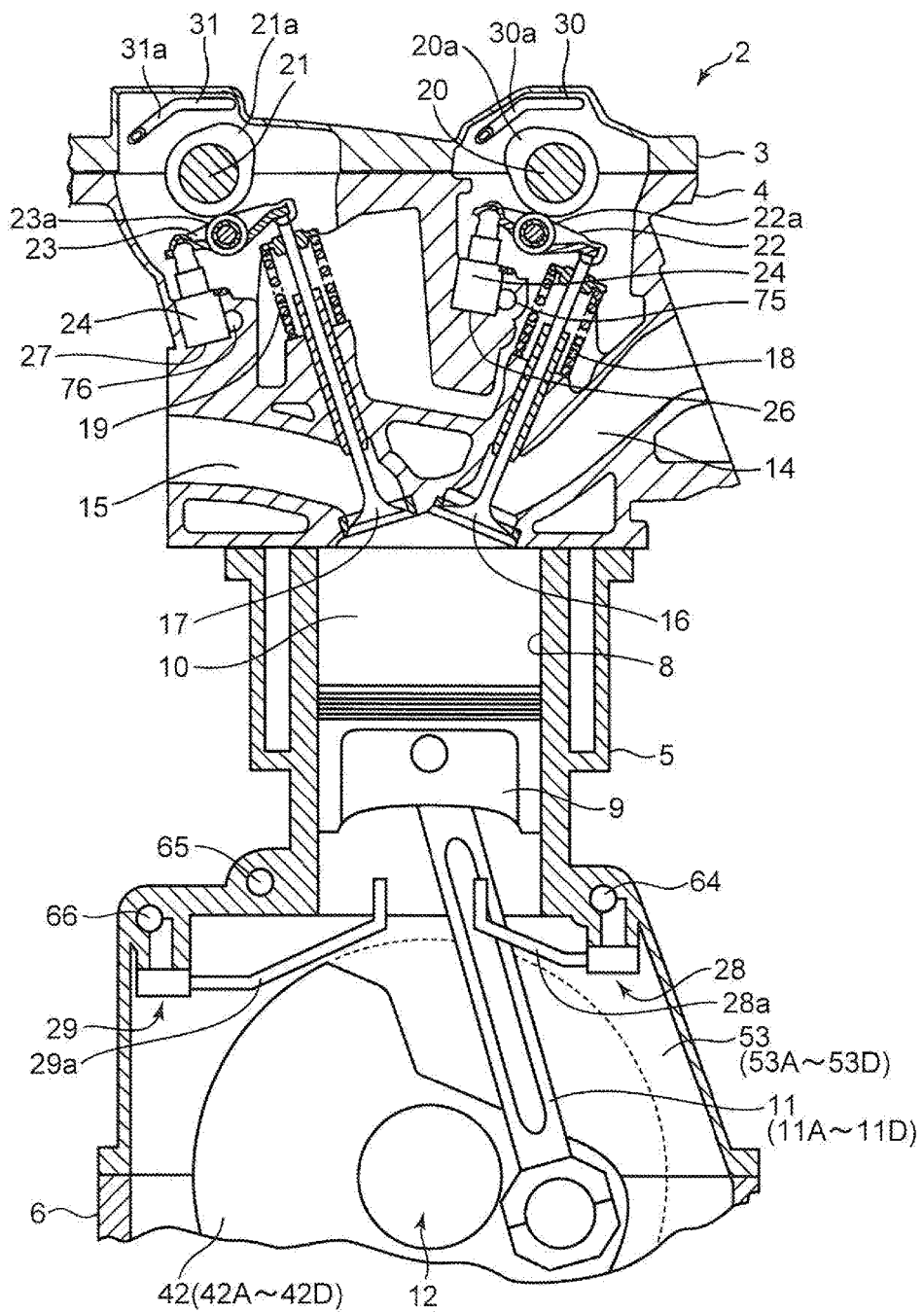
FIG. 1 is a sectional view showing a schematic configuration of a multi-cylinder engine to which an oil supply apparatus according to the present invention is applied.

FIG. 1 shows a multi-cylinder engine 2 (hereinafter, simply referred to as an engine 2) to which an oil supply apparatus according to the present invention is applied. The engine 2 is an in-line four-cylinder gasoline engine in which a first cylinder #1 to a fourth cylinder #4 are arranged in order in a straight row in a direction perpendicular to a paper plane of FIG. 1 and which is mounted to a vehicle such as an automobile.

Figure 6:
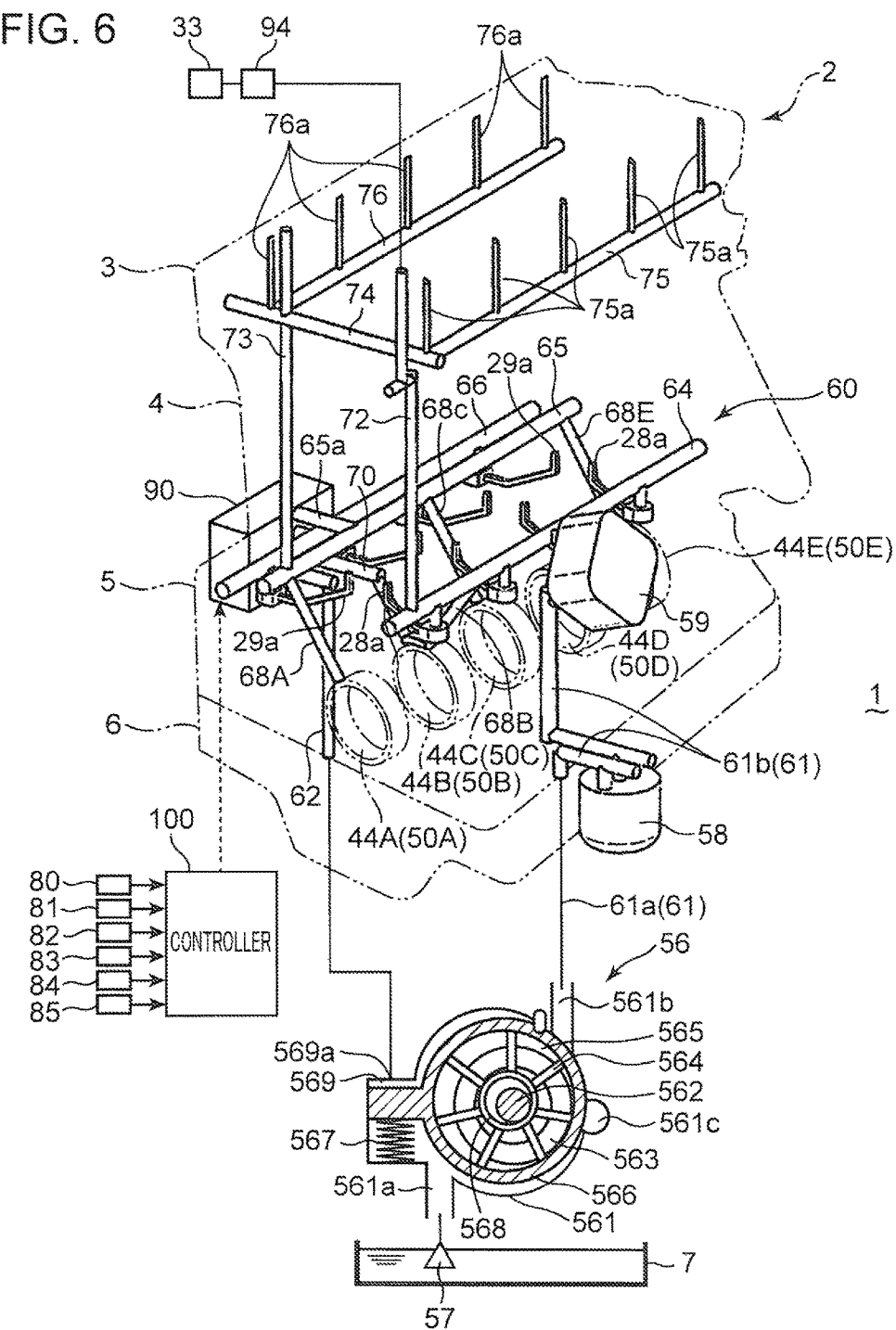
FIG. 6 is a schematic view showing an overall configuration of an oil supply apparatus.

The engine 2 includes a vertically coupled cam cap 3, a cylinder head 4, a cylinder block 5, a crank case 6, and an oil pan 7 (refer to FIG. 6). Four cylinder bores 8 are formed in the cylinder block 5, and a piston 9 is slidably housed in each of the cylinder bores 8. The piston 9, the cylinder bore 8, and the cylinder head 4 form a combustion chamber 10 for each cylinder. Moreover, each piston 9 is coupled via a connecting rod 11 to a crank shaft 12 which is rotatably supported by the cylinder block 5 and the like.

An intake port 14 and an exhaust port 15 which open to the combustion chamber 10 are provided on the cylinder head 4, and an intake valve 16 and an exhaust valve 17 which respectively open and close the intake port 14 and the exhaust port 15 are respectively mounted to the ports 14 and 15.

The intake valve 16 and the exhaust valve 17 are respectively biased in a direction that closes the respective ports 14 and 15 (an upward direction in FIG. 1) by return springs 18 and 19, and are configured to open the respective ports 14 and 15 by being pressed down by cam sections 20a and 21a provided on outer peripheries of cam shafts 20 and 21. Specifically, with a rotation of the cam shafts 20 and 21, the cam sections 20a and 21a press down on cam followers 22a and 23a provided in approximately central portions of swing arms 22 and 23, and the swing arms 22 and 23 swing with a vertex of a pivot mechanism of a hydraulic lash adjuster (hereinafter, referred to as HLA) 24 provided on one end side of the swing arms 22 and 23 as a fulcrum. In accordance with the swinging, other end sections of the swing arms 22 and 23 press down on the intake valve 16 and the exhaust valve 17 against biasing forces of the return springs 18 and 19. As a result, the respective ports 14 and 15 are opened.

In the cylinder head 4, portions on an intake side and an exhaust side which correspond to each of the four cylinders are provided with mounting holes 26 and 27 to which the HLAs 24 are inserted and mounted. In addition, oil paths 75 and 76 which respectively communicate with the mounting holes 26 and 27 of the intake-side and exhaust-side HLAs 24 are formed in the cylinder head 4 so as to extend in a cylinder bank direction across the first to fourth cylinders. The oil paths 75 and 76 supply oil (operating oil) to the pivot mechanisms of the HLAs 24 mounted to the mounting holes 26 and 27, and the pivot mechanisms of the HLAs 24 automatically adjust valve clearance to zero using oil pressure (working pressure) of the oil.

In the cylinder block 5, a main gallery 64 (which corresponds to the main oil supply path according to the present invention) extending in the cylinder bank direction is provided inside a side wall on one side (intake side) of the cylinder bore 8 in the width direction of the cylinder block 5, and a pair of sub galleries 65 and 66 (which correspond to the first sub oil supply path and the second sub oil supply path according to the present invention) which are aligned at prescribed intervals in the width direction of the cylinder block 5 and which respectively extend in the cylinder bank direction are provided inside a side wall on another side (exhaust side) of the cylinder bore 8 in the width direction of the cylinder block 5. The respective galleries 64 to 66 are oil paths for supplying oil to be described in detail later.

An oil jet 28 for piston cooling which communicates with the main gallery 64 is provided at a position which is below the main gallery 64 and which corresponds to each piston 9. Meanwhile, an oil jet 29 for piston lubrication which communicates with the sub gallery 66 among the sub galleries 65 and 66 is provided at a position which is in a vicinity of a lower side of the sub gallery 66 that is positioned on an outer side in the width direction of the cylinder block 5 and which corresponds to each piston 9 (refer to FIGS. 8 and 9).

Among the oil jets 28 and 29, the oil jet 28 for piston cooling has a nozzle 28a that is fixed at a position further toward an intake side than the cylinder bore 8 on a ceiling surface of a crank chamber 53, and the oil jet 28 is configured to inject oil (cooling oil) in a shower-like pattern toward mainly a central part of a rear surface of the piston 9 from the nozzle 28a. On the other hand, the oil jet 29 for piston lubrication has a nozzle 29a that is fixed at a position on an exhaust side of the cylinder bore 8 on the ceiling surface of the crank chamber 53, and the oil jet 29 is configured to inject oil (lubricating oil) at a narrower angle than the oil jet 28 for piston cooling mainly toward a rear surface of a skirt section of the piston 9 from the nozzle 29a. A passage for guiding oil is formed on the skirt section of the piston 9 and oil injected from the nozzle 29a is guided to a piston sliding surface through the passage.

In addition, oil supply sections 30 and 31 (respectively corresponding to the third oil supply sections according to the present invention) are provided above the respective cam shafts 20 and 21. The oil supply sections 30 and 31 have nozzles 30a and 31a and are configured so that oil (lubricating oil) drips down from the nozzles 30a and 31a to the cam sections 20a and 21a (lubricated sections) of the cam shafts 20 and 21 and to contact sections (lubricated sections) between the swing arms 22 and 23 and the cam followers 22a and 23a which are positioned below the nozzles 30a and 31a. The cam shafts 20 and 21 and the swing arms 22 and 23 correspond to the valve drive mechanism according to the present invention. A variable valve timing mechanism (to be described in detail later) is assembled to the valve drive mechanism and changes opening and closing timings of the intake and exhaust valves 16 and 17 in accordance with an operation state of the engine 2.

Figure 2:
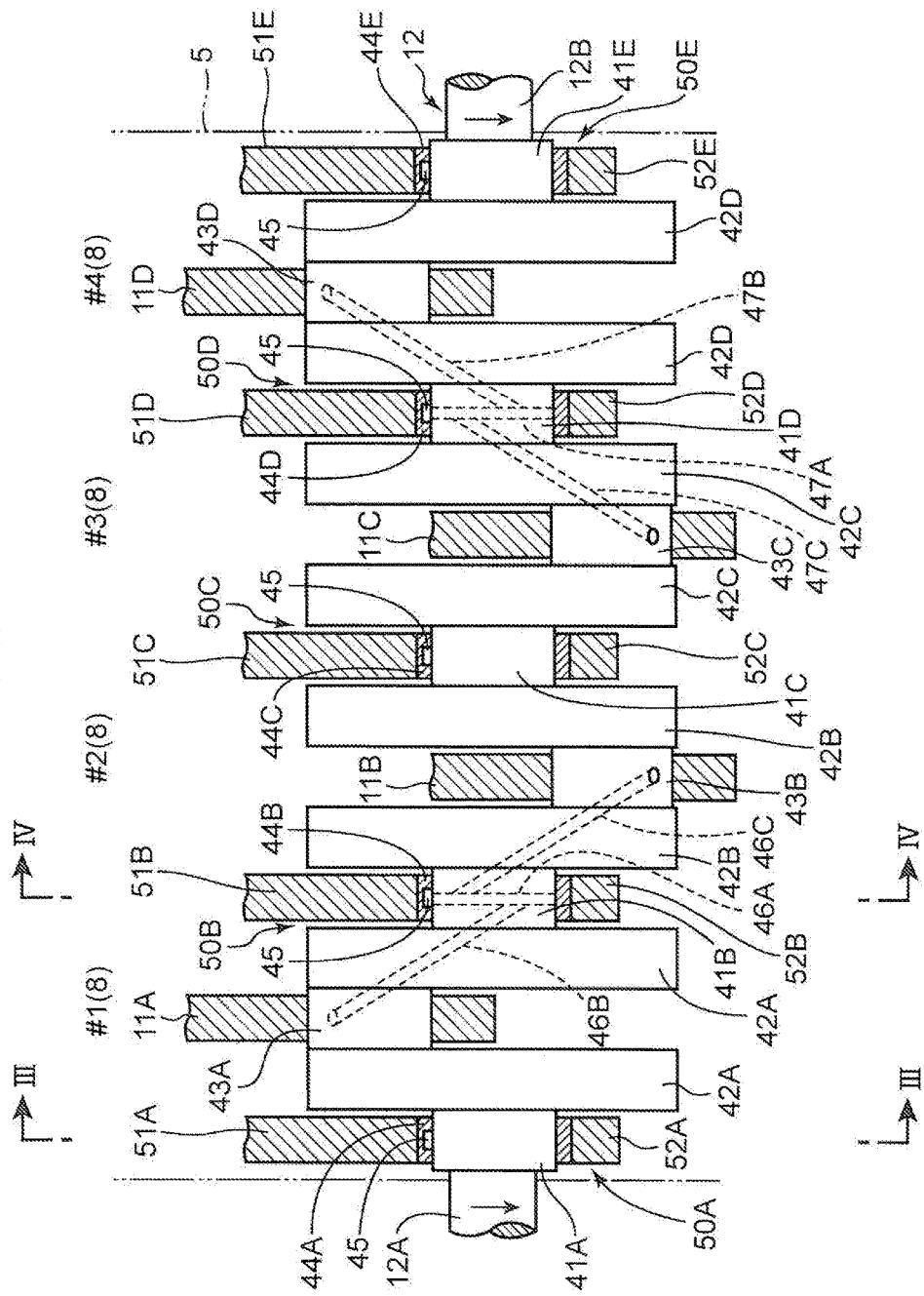
FIG. 2 is a vertical sectional view showing a detailed structure of a bearing portion of a crank shaft.

FIG. 2 shows a detailed structure of a bearing portion of the crank shaft 12 described above as a vertical sectional view.

From left to right in FIG. 2, the crank shaft 12 includes a first journal (crank journal) 41A adjacent to a front-side end section 12A of the crank shaft 12, a second journal 41B positioned between the first cylinder #1 and the second cylinder #2, a third journal 41C positioned between the second cylinder #2 and the third cylinder #3, a fourth journal 41D positioned between the third cylinder #3 and the fourth cylinder #4, and a fifth journal 41E adjacent to a rear-side end section 12B of the crank shaft 12.

A pair of first crank webs 42A and a first crank pin 43A are provided between the first journal 41A and the second journal 41B, a pair of second crank webs 42B and a second crank pin 43B are provided between the second journal 41B and the third journal 41C, a pair of third crank webs 42C and a third crank pin 43C are provided between the third journal 41C and the fourth journal 41D, and a pair of fourth crank webs 42D and a fourth crank pin 43D are provided between the fourth journal 41D and the fifth journal 41E.

In addition, a first connecting rod 11A that is coupled to the piston 9 of the first cylinder #1 is borne by the first crank pin 43A, a second connecting rod 11B that is coupled to the piston 9 of the second cylinder #2 is borne by the second crank pin 43B, a third connecting rod 11C that is coupled to the piston 9 of the third cylinder #3 is borne by the third crank pin 43C, and a fourth connecting rod 11D that is coupled to the piston 9 of the fourth cylinder #4 is borne by the fourth crank pin 43D.

The cylinder block 5 is provided with bearing sections that support the five journals 41A to 41E. Specifically, the bearing sections include a first bearing section 50A that supports the first journal 41A, a second bearing section 50B that supports the second journal 41B, a third bearing section 50C that supports the third journal 41C, a fourth bearing section 50D that supports the fourth journal 41D, and a fifth bearing section 50E that supports the fifth journal 41E. In the present example, the bearing sections 50A to 50E correspond to the crank bearing sections according to the present invention.

The respective bearing sections 50A to 50E include cylindrical bearing metals 44A to 44E (a first bearing metal 44A to a fifth bearing metal 44E) which have inner peripheral surfaces that oppose outer peripheral surfaces of the journals 41A to 41E, and bear the journals 41A to 41E with the bearing metals 44A to 44E by surface bearing.

The first bearing metal 44A provided in the first bearing section 50A is fixed between a first block-side supporting section 51A of the cylinder block 5 and a first bearing cap 52A that is coupled to the first block-side supporting section 51A. The second bearing metal 44B provided in the second bearing section 50B is fixed between a second block-side supporting section 51B of the cylinder block 5 and a second bearing cap 52B that is coupled to the second block-side supporting section 51B. The third bearing metal 44C provided in the third bearing section 50C is fixed between a third block-side supporting section 51C of the cylinder block 5 and a third bearing cap 52C that is coupled to the third block-side supporting section 51C. The fourth bearing metal 44D provided in the fourth bearing section 50D is fixed between a fourth block-side supporting section 51D of the cylinder block 5 and a fourth bearing cap 52D that is coupled to the fourth block-side supporting section 51D. The fifth bearing metal 44E provided in the fifth bearing section 50E is fixed between a fifth block-side supporting section 51E of the cylinder block 5 and a fifth bearing cap 52E that is coupled to the fifth block-side supporting section 51E.

Figure 9:
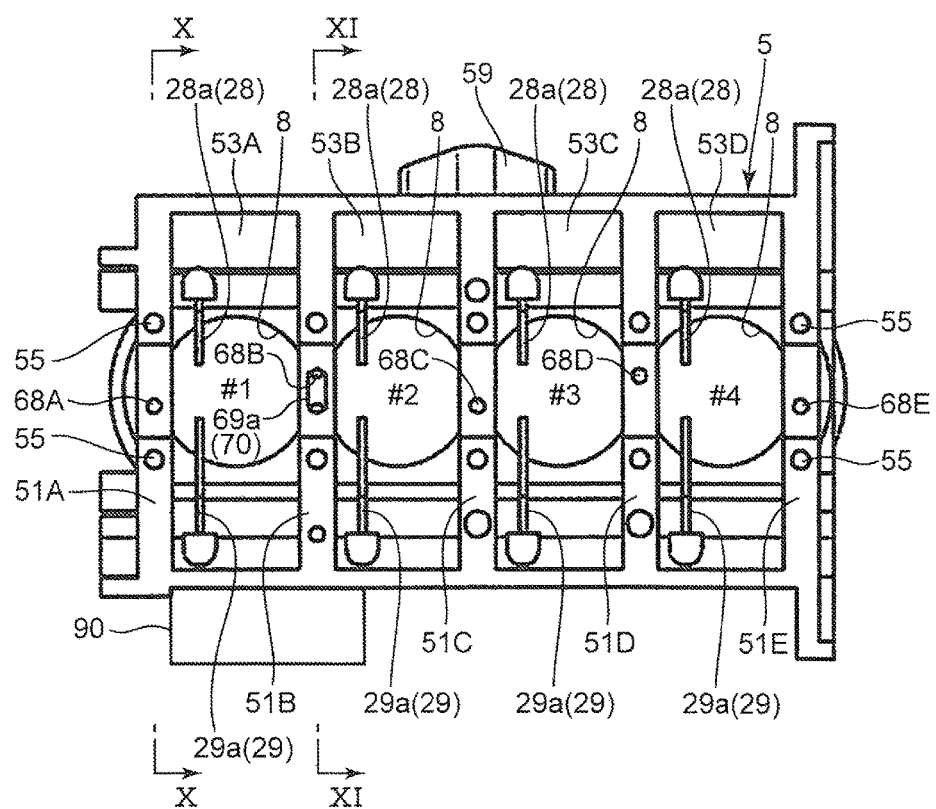
FIG. 9 is a lower view showing a cylinder block.

As shown in FIG. 9, the block-side supporting sections 51A to 51E are partitions that form crank chambers 53A to 53D which respectively correspond to the first cylinder #1 to the fourth cylinder #4 formed in the cylinder block 5 and are aligned at intervals corresponding to the journals 41A to 41E in the cylinder bank direction.

The respective bearing metals 44A to 44E are made up of an arc-shaped upper metal and an arc-shaped lower metal. The upper metal and the lower metal combine to form a cylindrical shape (refer to FIGS. 3 and 4). In addition, the bearing metals 44A and 44E are respectively arranged between an arc-shaped surface formed on the respective block-side supporting sections 51A to 51E and an arc-shaped surface formed on the respective bearing caps 52A to 52E and are sandwiched from both upper and lower sides by the block-side supporting sections 51A to 51E and the bearing caps 52A to 52E.

Figure 3:
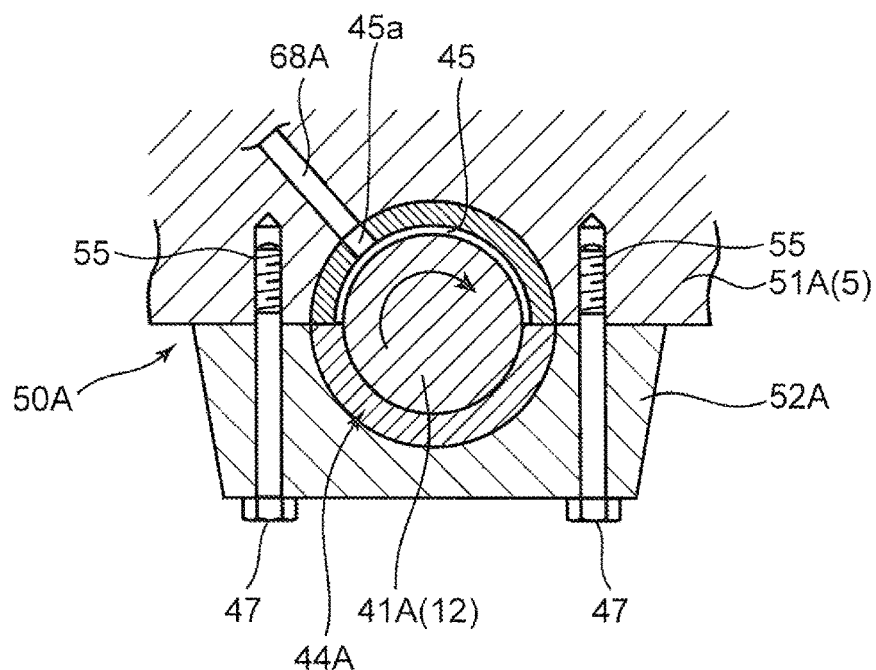
FIG. 3 is a vertical sectional view showing a first bearing section (a sectional view taken along line III-III in FIG. 2).
Figure 4:
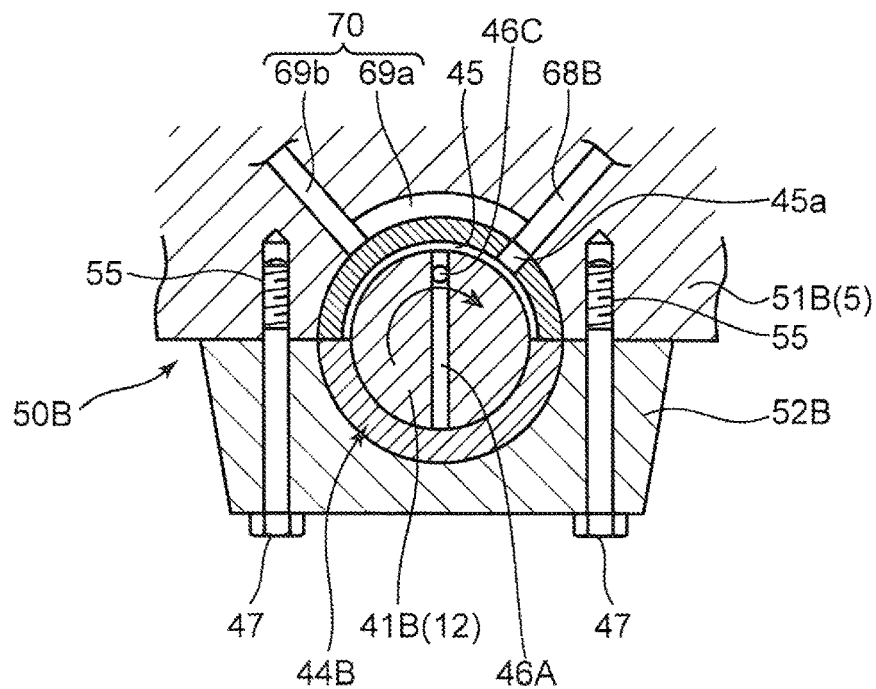
FIG. 4 is a vertical sectional view showing a second bearing section (a sectional view taken along line IV-IV in FIG. 2).

Moreover, as shown in FIGS. 3 and 4, the respective bearing caps 52A to 52E are respectively coupled by a bolt 47 to the block-side supporting sections 51A to 51E at positions on both sides of the respective journals 41A to 41E. Specifically, a pair of screw holes 55 is formed on both sides of the arc-shaped surfaces (bearing surfaces of the respective bearing metals 44A to 44E) which are lower surfaces of the respective block-side supporting sections 51A to 51E. In addition, as the bolt 47 is inserted from below through a through-hole formed on the respective bearing caps 52A to 52E and screwed and inserted to the screw hole 55, the respective bearing caps 52A to 52E are respectively coupled to the block-side supporting sections 51A to 51E.

Although a detailed description will be given later, a first supply oil path 68A to a fifth supply oil path 68E which respectively supply oil to the bearing sections 50A to 50E at positions of the respective block-side supporting sections 51A to 51E are formed in the cylinder block 5 (refer to FIGS. 6 and 7).

As shown in FIGS. 2 to 4, an oil groove 45 which stores oil supplied through the respective supply oil paths 68A to 68E is provided in a peripheral direction, and an oil supply hole 45a for receiving oil to the oil groove 45 is formed on an inner peripheral surface of the upper metal of the respective bearing metals 44A to 44E.

In addition, a first inside oil path 46A, a second inside oil path 46B, and a third inside oil path 46C are integrally and communicatively formed inside the crank shaft 12 from the first crank pin 43A, the first crank web 42A, the second journal 41B, the second crank web 42B, to the second crank pin 43B. In a similar manner, a first inside oil path 47A, a second inside oil path 47B, and a third inside oil path 47C are integrally and communicatively formed inside the crank shaft 12 from the fourth crank pin 43D, the fourth crank web 42D, the fourth journal 41D, the third crank web 42C, to the third crank pin 43C. In the present example, the inside oil paths 46A to 46C and 47A to 47C correspond to the inside passages according to the present invention.

One first inside oil path 46A penetrates the second journal 41B in a diameter direction and communicates with the oil groove 45. The second inside oil path 46B having branched from the first inside oil path 46A is opened to an outer peripheral surface of the first crank pin 43A and the third inside oil path 46C having branched from the first inside oil path 46A is opened to an outer peripheral surface of the second crank pin 43B (refer to FIG. 2). The other first inside oil path 47A penetrates the fourth journal 41D in a diameter direction and communicates with the oil groove 45. In addition, the second inside oil path 47B having branched from the first inside oil path 47A is opened to an outer peripheral surface of the fourth crank pin 43D and the third inside oil path 47C having branched from the first inside oil path 47A is opened to an outer peripheral surface of the third crank pin 43C (refer to FIG. 2).

In other words, the inside oil paths 46A to 46C positioned to the front of the crank shaft 12 supply oil which is supplied to the second bearing section 50B provided with the second bearing metal 44B through the second supply oil path 68B to the first crank pin 43A which bears the first connecting rod 11A and to the second crank pin 43B which bears the second connecting rod 11B. On the other hand, the inside oil paths 47A to 47C positioned to the rear of the crank shaft 12 supply oil which is supplied to the fourth bearing section 50D provided with the fourth bearing metal 44D through the fourth supply oil path 68D to the fourth crank pin 43D which bears the fourth connecting rod 11D and to the third crank pin 43C which bears the third connecting rod 11C.

<Configuration of Variable Valve Timing Mechanism>

In the engine 2, variable valve timing mechanisms 32 and 33 (hereinafter, simply referred to as VVTs 32 and 33) which change valve characteristics of the intake valve 16 and the exhaust valve 17 are built into all cylinders. In the present example, among the VVTs 32 and 33, the exhaust-side VVT 33 (which corresponds to the hydraulic valve characteristic varying apparatus according to the present invention) is a hydraulic VVT which changes valve characteristics by a hydraulic operation, and the intake-side VVT 32 is an electric VVT which changes valve characteristics by an electric operation or, more specifically, an operation of an electric motor. Different operational systems are adopted between the intake side and the exhaust side in this manner because, on the intake side, control of valve characteristics is often required immediately after start of the engine 2 and, accordingly, an electric system is more advantageous. In other words, while relatively high oil pressure is required to operate the hydraulic VVT, it is difficult to secure sufficient operating oil pressure and promptly control valve characteristics in an operation range immediately after the start of the engine where engine revolution and oil temperature are both low.

Hereinafter, a configuration of the exhaust-side VVT 33 will be described with reference to FIG. 5A, followed by a description of a configuration of the intake-side VVT 32.

Figure 5A:
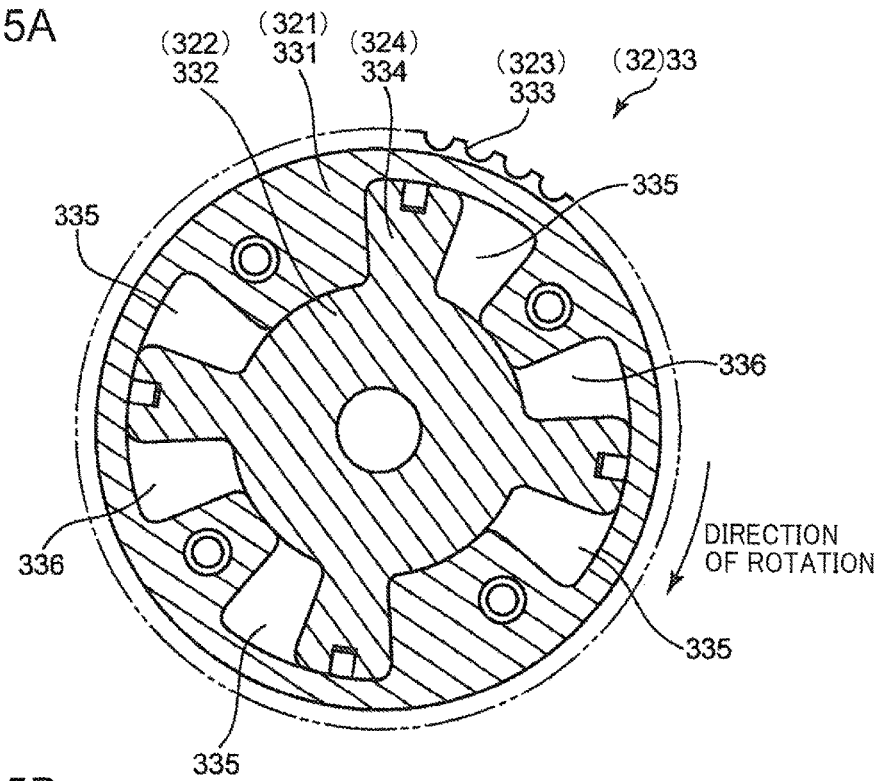
FIG. 5A is a sectional view showing a schematic configuration of a variable valve timing mechanism and FIG. 5B is a graph showing valve characteristics of an intake valve and an exhaust valve (relationships between phase and lift amount).

FIG. 5A shows a schematic configuration of the exhaust-side VVT 33 in a sectional view. The VVT 33 includes an approximately ring-like housing 331 and a rotor 332 housed inside the housing 331. The housing 331 is coupled so as to be integrally rotatable to a cam pulley 333 that rotates in synchronization with the crank shaft 12, and the rotor 332 is coupled so as to be integrally rotatable to a cam shaft 21 that opens and closes the exhaust valve 17. A retarded oil pressure chamber 335 and an advanced oil pressure chamber 336 which are defined by an inner peripheral surface of the housing 331 and vanes 334 provided on the rotor 332 are formed in plurality inside the housing 331. An oil pump 56 (to be described later; refer to FIG. 6) which supplies oil is connected via a direction switching valve 94 (refer to FIG. 6) to the retarded oil pressure chamber 335 and the advanced oil pressure chamber 336. Due to control of the direction switching valve 94, when oil is introduced into the retarded oil pressure chamber 335, the cam shaft 21 rotates in an opposite direction to a rotational direction thereof (a direction of an arrow in FIG. 5A) due to oil pressure and, accordingly, an opening timing of the exhaust valve 17 is delayed. On the other hand, when oil is introduced into the advanced oil pressure chamber 336, since the cam shaft 21 rotates in a rotational direction thereof due to oil pressure, an opening timing of the exhaust valve 17 is advanced.

With the exception of being electrically operated, the intake-side VVT 32 shares a basic configuration with the exhaust-side VVT 33. Specifically, although only indicated by reference numerals in FIG. 5A, the VVT 32 includes: a housing 321 which is coupled so as to be integrally rotatable to a cam pulley 323 that rotates in synchronization with a crank shaft 9; a rotor 322 which is housed inside the housing 321 and which is coupled so as to be integrally rotatable to the cam shaft 20 that opens and closes the intake valve 16; and a driving mechanism which includes an electric motor (not shown) and which relatively rotates the rotor 322 with respect to the housing 321. In addition, when the rotor 322 is rotationally driven in an opposite direction to a rotational direction of the cam shaft 20 (a direction of an arrow in FIG. 5A) by an operation of the electric motor, an opening timing of the intake valve 16 is delayed. On the other hand, when the rotor 322 is rotationally driven in a same direction as the rotational direction of the cam shaft 20, since the cam shaft 20 moves in the rotational direction, the opening timing of the intake valve 16 is advanced.

Figure 5B:
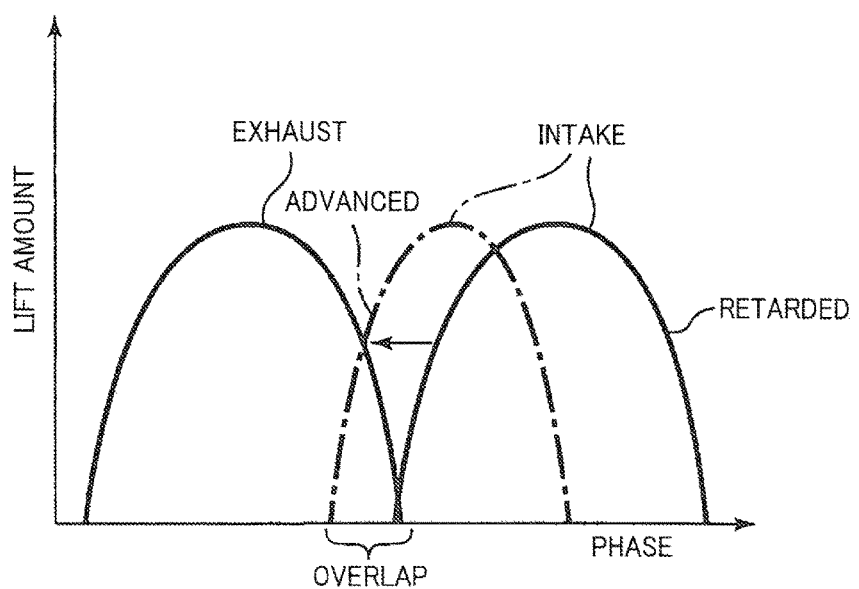

FIG. 5B shows valve opening phases of the intake valve 16 and the exhaust valve 17. As shown in FIG. 5B, when the valve opening phase of the intake valve 16 is changed in an advancing direction (refer to an arrow in FIG. 5B) (and/or the valve opening phase of the exhaust valve 17 is changed in a retarding direction) by the VVT 32 (and/or the VVT 33), a valve opening period of the exhaust valve 17 and a valve opening period of the intake valve 16 (refer to dashed-dotted line) overlap with each other. By causing the valve opening periods of the intake valve 16 and the exhaust valve 17 to overlap with each other in this manner, an internal EGR amount during engine combustion can be increased, and pumping loss can be reduced to improve fuel efficiency performance. In addition, since combustion temperature can be lowered, generation of NOx can be suppressed and exhaust gas can be purified. On the other hand, when the valve opening phase of the intake valve 16 is changed in a retarding direction (and/or the valve opening phase of the exhaust valve 17 is changed in an advancing direction) by the VVT 32 (and/or the VVT 33), an overlap amount of the valve opening period of the intake valve 16 (refer to solid line) and the valve opening period of the exhaust valve 17 decreases. Therefore, during a low load when the engine load is equal to or lower than a prescribed value such as during idling, stable combustion characteristics can be secured. In the present embodiment, the valve opening periods of the intake valve 16 and the exhaust valve 17 are arranged to overlap with each other even during a low load in order to maximize an amount of valve overlap during a high load.

<Description of Oil Supply Apparatus>

Next, the oil supply apparatus 1 for supplying oil (operating oil) to respective hydraulic operating sections of the engine 2 will be described in detail with reference to FIG. 6. "Hydraulic operating sections" refer to apparatuses (the HLAs 24, the VVT 33, and the like) which are driven by receiving oil pressure of oil or to oil supply sections (the oil jets 28 and 29, the oil supply sections 30 and 31, and the like) which supply oil using its oil pressure to an object as lubricating oil or cooling oil.

As illustrated, the oil supply apparatus 1 includes an oil pump 56 that is driven by rotation of the crank shaft 12 and an oil supply path 60 which is connected to the oil pump 56 and which guides oil pressurized by the oil pump 56 to the respective hydraulic operating sections of the engine 2. Moreover, the oil pump 56 is an auxiliary machine driven by the engine 2.

The oil pump 56 according to the present embodiment is a known variable displacement oil pump. The oil pump 56 includes: a housing 561 that is made up of a pump body with a C-shaped section which is formed so that one end side is opened and which internally includes a pump housing chamber constituted by a columnar space and a cover member which closes the opening of the pump body; a driving shaft 562 which is rotatably supported by the housing 561, which penetrates an approximately central part of the pump housing chamber, and which is rotationally driven by the crank shaft 12; a pump element that is made up of a rotor 563 which is rotatably housed inside the pump housing chamber and whose central part is coupled to the driving shaft and vanes 564 which are respectively retractably housed in a plurality of slits that are radially cut and formed in an outer peripheral section of the rotor 563; a cam ring 566 which is eccentrically arranged with respect to a center of rotation of the rotor 563 on an outer peripheral side of the pump element and which defines pump chambers 565 that are a plurality of operating oil chambers together with the rotor 563 and adjacent vanes 564; a spring 567 that is a biasing member which is housed in the pump body and which constantly biases the cam ring 566 in a direction in which an amount of eccentricity of the cam ring 566 with respect to the center of rotation of the rotor 563 increases; and a pair of ring members 568 which is slidably arranged in both side sections on an inner peripheral side of the rotor 563 and which has a smaller diameter than the rotor 563. The housing 561 includes an inlet 561a which supplies oil to the internal pump chamber 565 and an discharge port 561b which discharges oil from the pump chamber 565. A pressure chamber 569 which is defined by an inner peripheral surface of the housing 561 and an outer peripheral surface of the cam ring 566 is formed inside the housing 561, and the housing 561 is provided with an introduction hole 569a that opens to the pressure chamber 569. In other words, the oil pump 56 is configured such that, when oil is introduced to the pressure chamber 569 from the introduction hole 569a, the cam ring 566 swings with respect to a fulcrum 561c, the rotor 563 becomes relatively eccentric with respect to the cam ring 566, and discharge capacity changes.

An oil strainer 57 which faces the oil pan 7 is coupled to the inlet 561a of the oil pump 56. An oil filter 58 and an oil cooler 59 are arranged in order from an upstream side in an oil path 61 which communicates with the discharge port 561b of the oil pump 56. Oil stored in the oil pan 7 is pumped by the oil pump 56 through the oil strainer 57, filtered by the oil filter 58, cooled by the oil cooler 59, and subsequently introduced to the main gallery 64 (to be described below) in the cylinder block 5. Moreover, in FIG. 5, the oil pump 56 and the oil pan 7 are illustrated separately from the engine 2 for the sake of convenience.

An oil path 62 which introduces oil from the main gallery 64 to the pressure chamber 569 of the oil pump 56 is connected to the oil pump 56. A second oil control valve 93 (to be described later) constituted by a linear solenoid valve is provided between the oil path 62 and the main gallery 64. A capacity of the oil pump 56 changes as an oil flow rate (oil pressure) introduced to the pressure chamber 569 is changed by the second oil control valve 93.

The oil supply path 60 is made up of passages formed in the cylinder head 4, the cylinder block 5, the crank case 6, and the like as well as pipes. Moreover, in the following description, the cylinder head 4, the cylinder block 5, and the crank case 6 will be referred to as an engine main body when appropriate.

Figure 7:
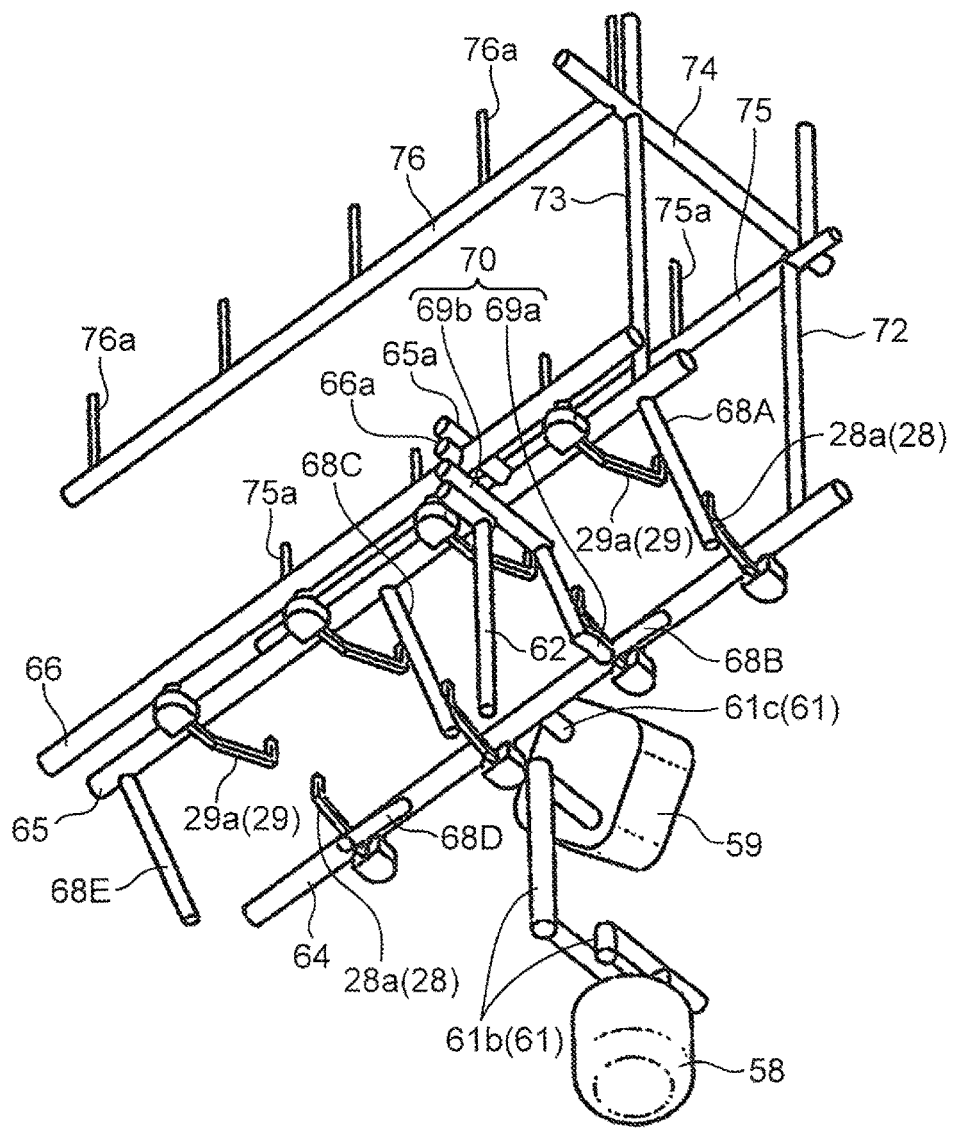
FIG. 7 is a schematic view solely showing an oil supply path (in state where the oil supply path is viewed from diagonally below an engine).

As shown in FIGS. 6 and 7, the oil supply path 60 includes: the upstream-side main gallery 64 for mainly guiding oil to hydraulic operating sections with high required pressure among the hydraulic operating sections; the pair of downstream-side sub galleries 65 and 66 for guiding oil to hydraulic operating sections with relatively low required pressure (hydraulic operating sections whose required pressure is lower than the hydraulic operating sections to which oil is directly supplied from the main gallery); the oil path 61 for oil introduction which guides oil discharged from the oil pump 56 to the main gallery 64 via the oil filter 58 and the oil cooler 59; the oil path 62 which extracts oil from the main gallery 64 and which guides oil for pump control to the pressure chamber 569 of the oil pump 56; and various oil paths branched from the main gallery 64 and the like.

The oil path 61 includes: a pipe 61a which connects the discharge port 561b of the oil pump 56 and a port portion of the crank case 6 to each other; a passage 61b which is formed in the engine main body so as to reach the oil cooler 59 that is fixed to a side surface (an intake-side side surface) of the cylinder block 5 from the port portion via the oil filter 58 fixed on a side portion (an intake-side side surface) of the crank case 6; a passage 61c which connects the oil cooler 59 and the main gallery 64 to each other.

As shown in FIGS. 1 and 6, the main gallery 64 is provided in the cylinder block 5 at a position which is more outward (more toward an intake side) than the cylinder bore 8 in a width direction of the cylinder block 5 and which is in a vicinity of a lower end section of the cylinder bore 8. The main gallery 64 extends in the cylinder bank direction. Meanwhile, the sub galleries 65 and 66 (referred to as a first sub gallery 65 and a second sub gallery 66) are respectively provided in the cylinder block 5 on an opposite side to the main gallery 64 with the cylinder bore 8 as center so that the second sub gallery 66 is positioned more outward in the width direction of the cylinder block 5 (more toward a side opposite to the cylinder bore 8) than the first sub gallery 65. The sub galleries 65 and 66 are aligned at a prescribed interval in the width direction of the cylinder block 5. The respective galleries 64 to 66 including the main gallery 64 extend horizontally in a straight line in the cylinder bank direction so as to be parallel to each other.

Oil supply paths which respectively branch from the main gallery 64 and the first sub gallery 65 and which supply oil to the bearing sections 50A to 50E are formed in the cylinder block 5.

Specifically, as shown in FIGS. 6 and 7, the first supply oil path 68A, the third supply oil path 68C, and the fifth supply oil path 68E (respectively corresponding to the second oil supply sections according to the present invention) which respectively branch from the first sub gallery 65 and which reach the first bearing section 50A, the third bearing section 50C, and the fifth bearing section 50D are formed in the cylinder block 5. Also, the second supply oil path 68B and the fourth supply oil path 68D (respectively corresponding to the first oil supply sections according to the present invention) which respectively branch from the main gallery 64 and which reach the second bearing section 50B and the fourth bearing section 50D are formed in the cylinder block 5.

Figure 10:
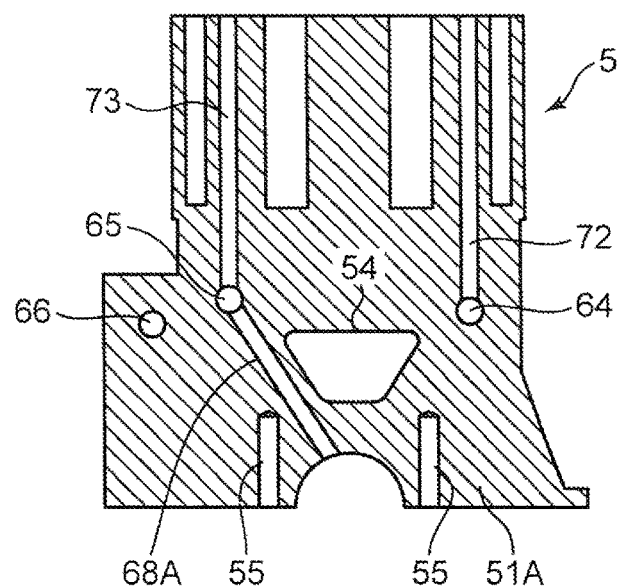
FIG. 10 is a sectional view of a cylinder block (a sectional view taken along line X-X in FIG. 9).

As shown in FIGS. 9 and 10, the first supply oil path 68A is formed in the first block-side supporting section 51A of the cylinder block 5. The first supply oil path 68A branches from the second sub gallery 66 at a position of the first block-side supporting section 51A in the cylinder bank direction and extends diagonally downward from the second sub gallery 66 toward the first bearing section 50A. In addition, as shown in FIG. 3, the first supply oil path 68A opens to the arc-shaped surface of the first block-side supporting section 51A which supports the first bearing metal 44A at a position opposing an outer peripheral surface of the first bearing metal 44A. Accordingly, oil is supplied to the oil groove 45 of the first bearing metal 44A from the first sub gallery 65 through the first supply oil path 68A. Moreover, the oil supply hole 45a of the first bearing metal 44A is formed at a position opposing the first supply oil path 68A.

Although not illustrated, the third supply oil path 68C is formed in the third block-side supporting section 51C in a similar manner to the first supply oil path 68A, and the fifth supply oil path 68E is formed in the fifth block-side supporting section 51E in a similar manner. Moreover, reference numeral 54 in FIGS. 10 and 11 denotes an opening formed on the block-side supporting sections 51A to 51E and adjacent crank chambers 53A to 53D communicate with each other through the opening 54.

Figure 11:
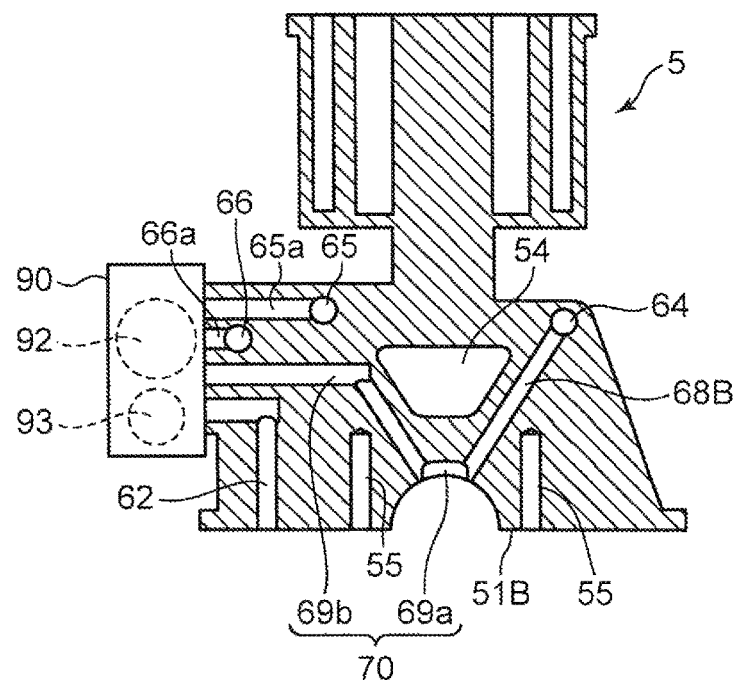
FIG. 11 is a sectional view of a cylinder block (a sectional view taken along line XI-XI in FIG. 9).

On the other hand, as shown in FIGS. 9 and 11, the second supply oil path 68B is formed in the second block-side supporting section 51B of the cylinder block 5. The second supply oil path 68B branches from the main gallery 64 at a position of the second block-side supporting section 51B in the cylinder bank direction and extends diagonally downward from the main gallery 64 toward the second bearing section 50B. In addition, as shown in FIG. 4, the second supply oil path 68B opens to the arc-shaped surface of the second block-side supporting section 51B which supports the second bearing metal 44B at a position opposing an outer peripheral surface of the second bearing metal 44B. Accordingly, oil is supplied to the oil groove 45 of the second bearing metal 44B from the main gallery 64 through the second supply oil path 68B. Moreover, the oil supply hole 45a of the second bearing metal 44B is formed at a position opposing the second supply oil path 68B.

Although not illustrated, the fourth supply oil path 68D is formed in the fourth block-side supporting section 51D in a similar manner to the second supply oil path 68B.

A relay oil path 70 for connecting the main gallery 64 and the sub galleries 65 and 66 to each other in the width direction of the cylinder block 5 as shown in FIGS. 4 and 11 is further formed in the second block-side supporting section 51B. As shown, the relay oil path 70 is made up of: a groove-like oil path 69a which extends in a peripheral direction along an outer peripheral surface of the second bearing metal 44B and whose one end portion communicates with the second supply oil path 68B; and an oil path 69b which communicates with the oil path 69a at another end portion of the oil path 69a, which extends diagonally upward from the other end portion of the oil path 69a toward a position of the first sub gallery 65, which bends at a position slightly below the first sub gallery 65 and passes a position below the second sub gallery 66, and which opens to an exhaust-side side surface of the cylinder block 5.

Figure 8:
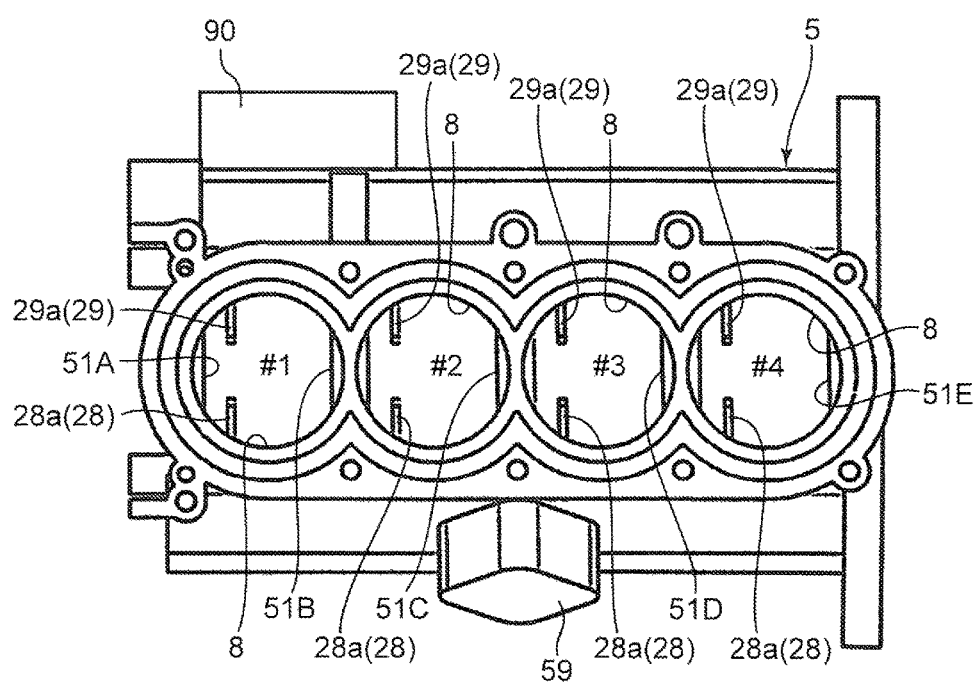
FIG. 8 is a plan view showing a cylinder block.

An OCV (oil control valve) unit 90 is fixed to a region which is the exhaust-side side surface of the cylinder block 5 and which ranges from the second block-side supporting section 51B to the first block-side supporting section 51A (refer to FIGS. 6, 8, and 9).

Figure 12:
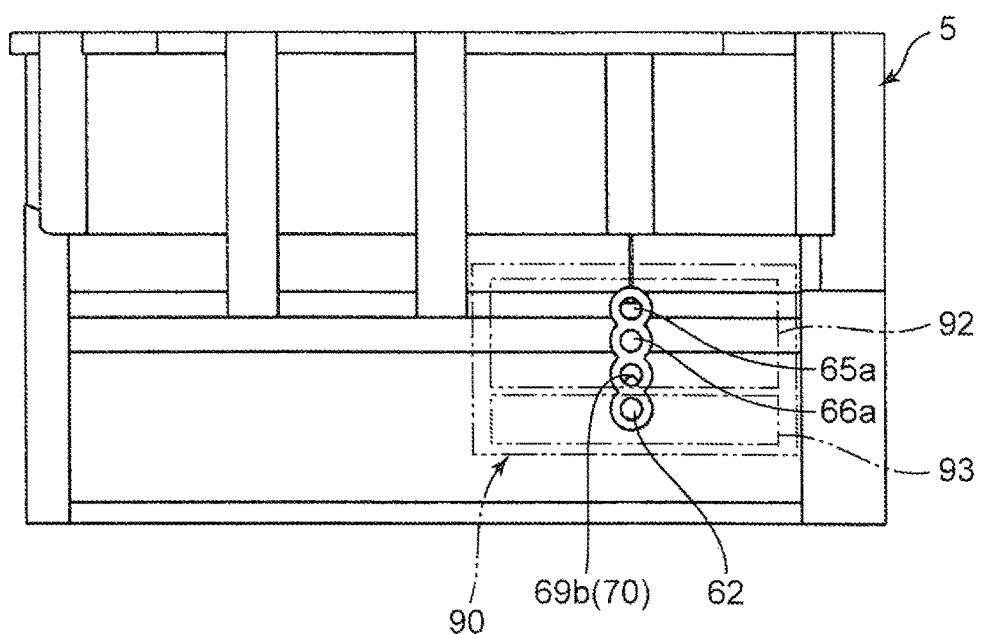
FIG. 12 is a side view of a cylinder block.

As shown in FIGS. 11 and 12, two oil control valves, namely, first and second oil control valves 92 and 93 are housed in the OVC unit 90. While schematically shown, the first oil control valve 92 is connected to the first sub gallery 65 and the second sub gallery 66 via relay oil paths 65a and 66a respectively formed in the cylinder block 5 and connected to the main gallery 64 via the relay oil path 70 and the second supply oil path 68B. Meanwhile, the second oil control valve 93 is connected to the main gallery 64 via the relay oil path 70 and connected to the oil path 62 (an oil path for supplying oil to control a discharge amount of the oil pump 56) which is formed in the cylinder block 5. Accordingly, the main gallery 64 respectively communicates with the first sub gallery 65 and the second sub gallery 66 via the relay oil path 70, the first oil control valve 92, and the relay oil paths 65a and 66a and communicate with the oil path 62 via the relay oil path 70 and the second oil control valve 93. In the present example, the first oil control valve 92 corresponds to the oil control valve according to the present invention or, in other words, the "oil control valve which controls an oil flow rate of the sub oil supply paths (the first sub oil supply path and the second sub oil supply path)".

As shown in FIGS. 1 and 9, the first crank chamber 53A to the fourth crank chamber 53D which correspond to the respective cylinders #1 to #4 are formed between the block-side supporting sections 51A to 51E that are adjacent to each other in the cylinder block 5. As described earlier, as shown in FIGS. 1 and 6, the nozzles 28a of the oil jets 28 for piston cooling are fixed in ceiling portions of the respective crank chambers 53A to 53D at positions below the main gallery 64, and the respective nozzles 28a are connected to the main gallery 64. In addition, the nozzles 29a of the oil jets 29 for piston lubrication are fixed in ceiling portions of the respective crank chambers 53A to 53D at positions below the second sub gallery 66, and the respective nozzles 29a are connected to the second sub gallery 66.

As shown in FIGS. 1, 8, and 9, the nozzles 28a and 29a of the respective oil jets 28 and 29 are provided so that the nozzles 28a and 29a extend from positions outside the cylinder bore 8 to positions below the cylinder bore 8 in a state where the nozzles 28a and 29a approximately follow the ceiling portions of the respective crank chambers 53A to 53D and that tips of the nozzles are directed toward the piston 9.

As shown in FIGS. 6 and 7, the engine main body further includes a branch oil path 72 which branches from an end section on a side of the first cylinder #1 of the main gallery 64 of the cylinder block 5 and which extends to the cylinder head 4. The branch oil path 72 is for supplying operating oil to the VVT 33 described earlier and communicates with the retarded oil pressure chamber 335 and the advanced oil pressure chamber 336 of the VVT 33 via the direction switching valve 94.

In addition, the engine main body includes a branch oil path 73 which branches from an end section on a side of the first cylinder #1 of the first sub gallery 65 and which extends to the cylinder head 4. An oil path 74 which extends in the cylinder head 4 in a width direction thereof is connected to the branch oil path 73. An oil path 75 which extends horizontally in the cylinder bank direction at a prescribed position on an intake side in the cylinder head 4 and an oil path 76 which extends horizontally in the cylinder bank direction at a prescribed position on an exhaust side in the cylinder head 4 branch from the oil path 74. Among the oil paths 75 and 76, the intake-side HLA 24 communicates with the intake-side oil path 75, and a nozzle of an oil supply section (not shown) for lubricating a cam journal of the exhaust-side cam shaft 20 communicates with the exhaust-side oil path 75 via the branch oil path 75a. In a similar manner, the exhaust-side HLA 24 communicates with the exhaust-side oil path 76, and a nozzle of an oil supply section (not shown) for lubricating a cam journal of the intake-side cam shaft 21 communicates with the exhaust-side oil path 76 via the branch oil path 76a.

An upper end of the branch oil path 73 of the first sub gallery 65 extends to the cam cap 3, and the nozzle 30a of the oil supply section 30 which supplies lubricating oil to the intake-side swing arm 22 and the nozzle 31a of the oil supply section 31 which supplies lubricating oil to the exhaust-side swing arm 23 respectively communicate with the branch oil path 73 via oil paths (not shown).

In addition, an oil pressure sensor 80 which detects oil pressure of the main gallery 64 is connected to a vicinity of an end section of the main gallery 64 on the side of the first cylinder #1, and a signal in accordance to the oil pressure of the main gallery 64 is output to a controller 100 (to be described later) by the oil pressure sensor 80 during driving of the engine 2. Moreover, the oil pressure sensor 80 corresponds to the "oil pressure sensor that detects an oil pressure of the main oil supply path" according to the present invention.

Moreover, although not illustrated, lubricating oil and cooling oil which are supplied to the cam journals that rotatably support the cam shafts 20 and 21, the bearing metals 44A to 44E that rotatably support the crank shaft 12, the piston 9, the cam shafts 20 and 21, and the like drip down to the oil pan 7 through an drain oil path (not shown) after cooling or lubrication completed and are once again recirculated by the oil pump 56.

Operations of the engine 2 such as those described above are controlled by the controller 100 (which corresponds to the control apparatus according to the present invention). The controller 100 is a known microcomputer-based control apparatus and integrally controls oil pressure inside the oil supply path 60. Detection information from various sensors that detect operation states of the engine 2 is input to the controller 100. For example, in addition to the oil pressure sensor 80, the engine 2 is provided with a crank angle sensor 81 which detects a rotation angle of the crank shaft 12, an air flow sensor 82 which detects an amount of air sucked in by the engine 2, an oil temperature sensor 83 which detects an oil temperature inside the oil supply path 60, a cam angle sensor 84 which detects rotation phases of the cam shafts 20 and 21, and a water temperature sensor 85 which detects temperature of cooling water in the engine 2, and detection information from these sensors 80 to 85 is input to the controller 100. The controller 100 detects an engine rotational speed (revolution) based on detection information of the crank angle sensor 81, detects an engine load based on detection information of the air flow sensor 82, and detects an operating angle of the VVTs 32 and 33 based on detection information of the cam angle sensor 84.

Based on detection information from the respective sensors 80 to 85, the controller 100 determines an operation state of the engine 2, sets target oil pressure based on a map stored in advance, and performs feedback control on oil pressure in the oil supply path 60 based on the target oil pressure. Specifically, an oil discharge amount of the oil pump 36 is controlled by an operation of the second oil control valve 93. In other words, the controller 100 includes: a signal input section to which detection signals from the respective sensors 80 to 85 are input; an arithmetic section which performs various arithmetic processes; a signal output section which outputs a control signal to an apparatus that is a control object (the second oil control valve 93); and a storage section which stores programs and data (an oil pressure control map to be described later) which are necessary for control.

More specifically, the oil supply apparatus 1 supplies oil to a plurality of hydraulic operating sections (the VVT, the HLAs 24, the oil jets 28 and 29, the oil supply sections 30 and 31, and the like) using one oil pump 56. Required oil pressure of the respective hydraulic operating sections changes in accordance with an operation state of the engine 2. Therefore, for all hydraulic operating sections to obtain necessary oil pressure in all operation states of the engine 2, it is rational to set, for each operation state of the engine 2, oil pressure equal to or higher than highest required oil pressure of the required oil pressure of the respective hydraulic operating sections as target oil pressure in accordance with the operation state of the engine 2. In order to do so, target oil pressure may be set so as to satisfy required oil pressure of oil supply sections (in other words, the second supply oil path 68B and the fourth supply oil path 68D) or the like, responsible for hydraulic operating sections with relatively high required oil pressure among all hydraulic operating sections which, in the present embodiment, are the VVT 33, the oil jets 28 and 29, and the second and fourth bearing sections 50B and 50D, in which case an oil discharge amount of the oil pump 56 may be controlled based on the target oil pressure. Target oil pressure set in this manner naturally satisfies required oil pressure of other hydraulic operating sections with relatively low required oil pressure.

Figure 13A:
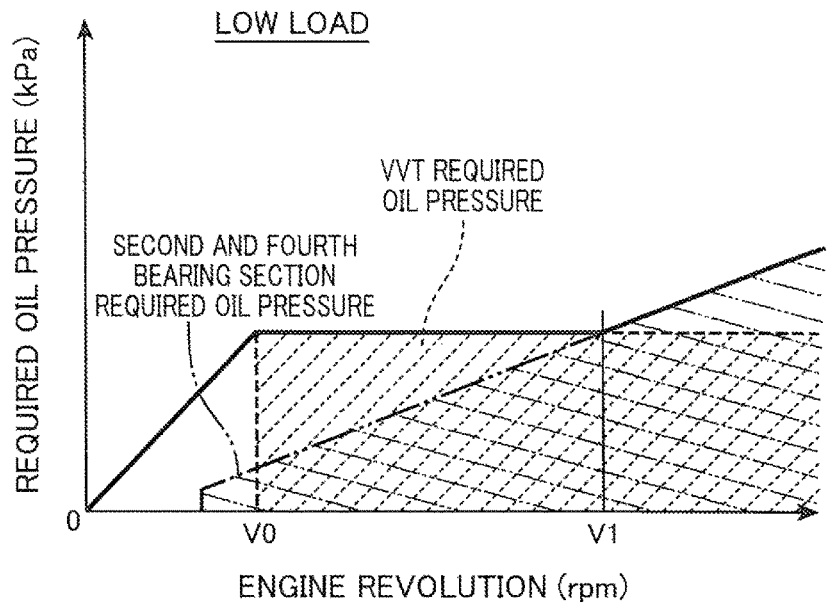
FIG. 13A is a diagram (map) showing a relationship between required oil pressure of a main gallery under a low load and engine revolution.
Figure 13B:
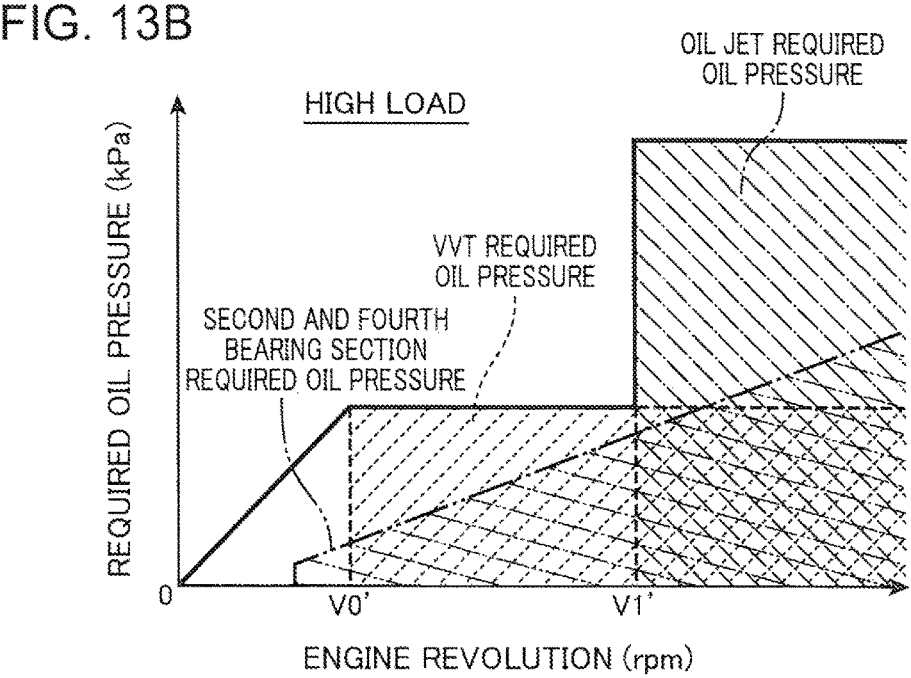
FIG. 13B is a diagram (map) showing a relationship between required oil pressure of the main gallery under a high load and engine revolution.

FIG. 13 is a map for oil pressure control showing a relationship between engine revolution and required oil pressure of hydraulic operating sections, in which FIG. 13A is a map mainly showing a relationship during low-load operation and FIG. 13B is a map showing a relationship during high-load operation.

As shown in FIG. 13A, during a low-load operation of the engine 2, the hydraulic operating sections with relatively high required oil pressure are the VVT 33 and the oil supply sections of the second and fourth bearing sections 50B and 50D. Required oil pressure of these hydraulic operating sections changes in accordance with an operation state of the engine 2. For example, the required oil pressure of the VVT 33 (hereinafter, abbreviated as VVT required oil pressure) is approximately constant when engine rotational speed is equal to or higher than V0. The required oil pressure of oil supply sections of the second and fourth bearing sections 50B and 50D (hereinafter, abbreviated as second and fourth bearing section required oil pressure) increases as the engine rotational speed increases. Comparing magnitudes of the required oil pressure for each engine rotational speed reveals that there is only the second and fourth bearing section required oil pressure when the engine rotational speed is lower than V0, the highest required oil pressure when the engine rotational speed is between V0 and V1 is the VVT required oil pressure, and the second and fourth bearing section required oil pressure becomes the highest required oil pressure when the engine rotational speed exceeds V1.

On the other hand, during a high-load operation of the engine 2, the hydraulic operating sections with relatively high required oil pressure are the VVT 33, the oil supply sections of the second and fourth bearing sections 50B and 50D, and the oil jets 28 and 29. The required oil pressure of these hydraulic operating sections changes in accordance with an operation state of the engine 2 in a similar manner to a low-load operation. The VVT required oil pressure is approximately constant when the engine rotational speed is equal to or higher than V0', and the second and fourth bearing section required oil pressure increases as the engine rotational speed increases. In addition, required oil pressure of the oil jets 28 and 29 (hereinafter, abbreviated as oil jet required oil pressure) is approximately constant when engine rotational speed is equal to or higher than V1' (>V0'). Comparing magnitudes of the required oil pressure for each engine rotational speed reveals that there is only the second and fourth bearing section required oil pressure when the engine rotational speed is lower than V0', the highest required oil pressure when the engine rotational speed is between V0' and V1' is the VVT required oil pressure, and the oil jet required oil pressure becomes the highest required oil pressure when the engine rotational speed exceeds V1'.

In the present embodiment, an oil pressure control map such as those shown in FIGS. 13A and 13B is stored in the controller 100, and the controller 100 reads highest required oil pressure in accordance with the operation state of the engine 2 or, in other words, a value on a required oil pressure line depicted by a solid line in FIG. 13 from the oil pressure control map and sets the read oil pressure as the target oil pressure. In addition, the controller 100 performs oil pressure feedback control in which a discharge amount of the oil pump 56 is controlled so that oil pressure (actual oil pressure) of the main gallery 64 as detected by the oil pressure sensor 80 equals the target oil pressure.

In this case, the controller 100 transmits a duty ratio control signal to the second oil control valve 93 and controls oil pressure supplied to the pressure chamber 569 of the oil pump 56 via the second oil control valve 93. By controlling an amount of eccentricity of the cam ring 566 with the oil pressure of the pressure chamber 569 to control an amount of change of an interior capacity of the pump chamber 565, a flow rate (discharge amount) of the oil pump 56 is controlled. In other words, the capacity of the oil pump 56 is controlled by the duty ratio. Moreover, a required oil pressure line when the engine rotational speed is lower than V0 (V0') assumes a straight line that approaches the required oil pressure of the VVT 33 as the engine rotational speed increases in the oil pressure control map shown in FIG. 13 to ensure that the required oil pressure of the VVT 33 is reliably secured when the engine rotational speed reaches V0 (V0') or, in other words, to eliminate time loss until the required oil pressure is reached.

Figure 14:
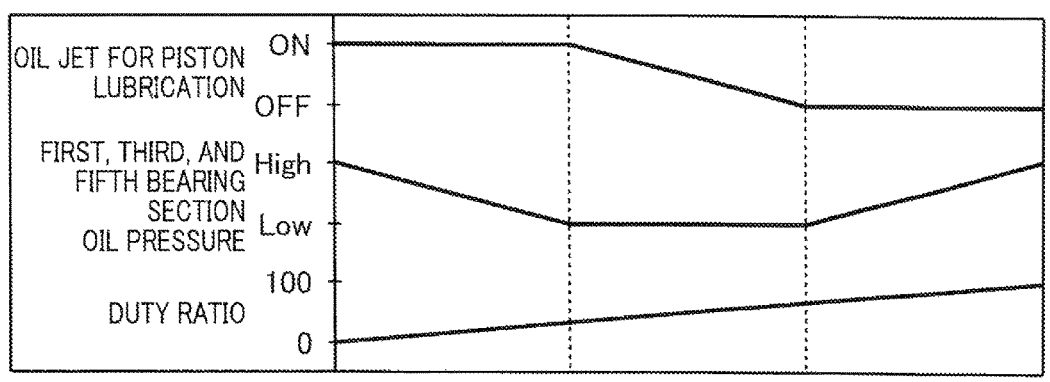
FIG. 14 is a diagram showing characteristics of a first oil control valve.

The controller 100 controls the discharge amount of the oil pump 56 in accordance with the operation state of the engine 2 via the second oil control valve 93 as described above, and controls flow rates of the respective sub galleries 65 and 66 via the first oil control valve 92. In other words, by controlling an oil flow rate (oil pressure) of the second sub gallery 66 in accordance with the operation state of the engine 2, the controller 100 turns oil injection by the oil jet 29 on/off. In addition, by controlling an oil flow rate (oil pressure) of the first sub gallery 65 based on oil pressure (actual oil pressure) of the first sub gallery 65 as detected by an oil pressure sensor (not shown), the controller 100 controls oil supply amounts to the first, third, and fifth bearing sections 50A, 50C, and 50E. Moreover, the first oil control valve 92 is configured to single-handedly control oil flow rates with respect to both sub galleries 65 and 66 in an interlocked manner. For example, by transmitting a duty ratio control signal to the first oil control valve 92, the controller 100 controls oil supply amounts to the first, third, and fifth bearing sections 50A, 50C, and 50E and on/off states of oil injection by the oil jet 29 as shown in FIG. 14.

<Operational Advantage of the Oil Supply Apparatus 1>

In the oil supply apparatus 1 described above, oil discharged from the oil pump 56 is filtered by the oil filter 58, cooled by the oil cooler 59, and introduced to the main gallery 64 in the cylinder block 5 through the oil path 61. Subsequently, a part of the oil is injected from the nozzle 28a of the oil jet 28 for cooling the piston 9, and another part of the oil is supplied to the second bearing section 50B and the fourth bearing section 50D of the crank shaft 12 through the second supply oil path 68B and the fourth supply oil path 68D and further supplied to the respective crank pins 43A to 43D through the inside oil paths 46A to 46C and 47A to 47C of the crank shaft 12. In addition, oil in the main gallery 64 is introduced from the second supply oil path 68B to the first sub gallery 65 and the second sub gallery 66 through the relay oil path 70, the first oil control valve 92, and the relay oil paths 65a and 66a and, at the same time, supplied to the VVT 33 through the oil path 72 that branches from the main gallery 64.

The oil introduced to the first sub gallery 65 is supplied to the first bearing section 50A, the third bearing section 50C, and the fifth bearing section 50E of the crank shaft 12 through the first supply oil path 68A, the third supply oil path 68C, and the fifth supply oil path 68E. In addition, a part of the oil introduced to the first sub gallery 65 is introduced to the cylinder head 4 through the branch oil path 73 that branches from the first sub gallery 65 and further supplied to the HLAs 24 through the oil paths 75 and 76 and, at the same time, supplied to cam journal portions of the cam shafts 20 and 21 through branch oil paths 75a and 76a which respectively branch from the oil paths 75 and 76. Furthermore, the oil is supplied from the respective nozzles 30a and 31a of the oil supply sections 30 and 31 to the swing arms 22 and 23 through the branch oil path 73.

The oil introduced to the second sub gallery 66 is injected from the nozzle 29a of the oil jet 29 to lubricate the piston 9.

According to the oil supply apparatus 1, as described above, highest required oil pressure of required oil pressure of the hydraulic operating sections such as the VVT 33, the HLAs 24 and 25, the oil jets 28 and 29, and the oil supply sections 30 and 31 is set as target oil pressure for each operation state of the engine 2, and a discharge amount of the oil pump 56 is controlled so that oil pressure (actual oil pressure) as detected by the oil pressure sensor 80 provided in the main gallery 64 equals the target oil pressure. Therefore, a drive load on the oil pump 56 can be kept at a necessary minimum while appropriately securing operating oil pressure (required oil pressure) of the respective hydraulic operating sections. In particular, while the engine 2 is configured such that oil is introduced into the crank shaft 12 from second and fourth journals 41A and 41D among the plurality of journals 41A to 41E of the crank shaft 12 and the oil is supplied to the respective crank pins 43A to 43D through the inside oil paths 46A to 46C and 47A to 47C formed in the crank shaft 12. According to the oil supply apparatus 1, since the discharge amount of the oil pump 56 is controlled as described above, oil supply to the bearing sections 50A to 50E of the respective journals 41A to 41E and the respective crank pins 43A to 43D can be appropriately performed while suppressing drive loss of the oil pump 56.

In addition, the oil supply apparatus 1 is provided with the first oil control valve 92 which controls an oil flow rate from the main gallery 64 to the first sub gallery 65, and oil supply amounts to the first, third, and fifth bearing sections 50A, 50C, and 50E are controlled based on oil pressure (actual oil pressure) as detected by an oil pressure sensor (not shown) arranged in the first sub gallery 65. For example, when the target oil pressure is higher than the required oil pressure of the oil supply sections (in other words, the first, third, and fifth supply oil paths 68A, 68C, and 68D) of the first, third, and fifth bearing sections 50A, 50C, and 50E, the controller 100 reduces the oil flow rate to suppress excessive oil supply. Therefore, an advantage in that appropriate amounts of oil can be appropriately supplied to the bearing sections 50A, 50C, and 50E may also be gained.

Furthermore, with the oil supply apparatus 1, an oil flow rate (oil pressure) of the second sub gallery 66 is controlled using the first oil control valve 92 in addition to the control of the oil flow rate (oil pressure) of the first sub gallery 65. In other words, the oil supply sections of the first, third, and fifth bearing sections 50A, 50C, and 50E as well as on/off states of oil injection (injection of lubricating oil to the piston 9) by the oil jet 29 are controlled by a common oil control valve (the first oil control valve 92). Therefore, the oil supply apparatus 1 also has an advantage of achieving a compact configuration with a consolidated oil control valve.

<Other Configurations>

The oil supply apparatus 1 described above is an example of a preferred embodiment of the engine oil supply apparatus according to the present invention and a specific configuration thereof can be modified as appropriate without departing from the gist of the present invention.

For example, the VVT 33, the HLAs 24, the oil jets 28 and 29, the oil supply sections 30 and 31, and the like connected to the oil supply path 60 are examples of hydraulic operating sections of the present invention and specific types of hydraulic operating sections and specific connection positions of the hydraulic operating sections on the oil supply path 60 are not limited to those of the embodiment described above.

In addition, while a pump that is driven by the engine 2 is applied as the oil pump 56 in the embodiment described above, the oil pump 56 may alternatively be driven by an electric motor which is capable of controlling a discharge amount by adjusting revolution.

Furthermore, while an example in which the present invention is applied to an in-line four-cylinder gasoline engine is described in the embodiment presented above, the present invention can also be applied to other engines such as a diesel engine.

The present invention described above can be summarized as follows.

Specifically, the present invention is an engine oil supply apparatus which is provided with a crank shaft including a plurality of crank journals and in which oil is introduced to inside of the crank shaft from a specific crank journal from among the plurality of crank journals and the oil is supplied to a crank pin through an inside passage formed in the crank shaft, the oil supply apparatus including: a variable oil pump which is capable of controlling a discharge amount; a main oil supply path into which oil discharged from the oil pump is introduced; a sub oil supply path which is connected to a downstream side of the main oil supply path in an oil flow direction; a first oil supply section which is connected to the main oil supply path and which supplies oil to a crank bearing section of the specific crank journal from among the plurality of crank journals; a second oil supply section which is connected to the sub oil supply path and which supplies oil to a crank bearing section of the crank journal other than the specific crank journal; a plurality of hydraulic operating sections which include at least the first oil supply section and the second oil supply section; an oil pressure sensor which detects an oil pressure of the main oil supply path; and a control apparatus which sets, as a target oil pressure, a highest required oil pressure among required oil pressures required from the plurality of hydraulic operating sections in accordance with an operation state of the engine, and which controls the discharge amount of the oil pump so that the oil pressure detected by the oil pressure sensor equals the target oil pressure.

According to this oil supply apparatus, since the highest required oil pressure of required oil pressures of respective hydraulic operating sections for each operation state of the engine is set as a target oil pressure and a discharge amount of the oil pump is controlled so that oil pressure (actual oil pressure) detected by the oil pressure sensor equals the target oil pressure, a drive load on the oil pump can be kept at a necessary minimum while appropriately securing operating oil pressures (required oil pressures) of the respective hydraulic operating sections including the first and second oil supply sections. Therefore, oil supply to the respective bearing sections of the crank journals and the respective crank pins can be appropriately performed while suppressing drive loss of the oil pump.

In this case, preferably, an oil control valve which controls an oil flow rate of the sub oil supply path is provided.

According to this configuration, by controlling the oil control valve, appropriate amounts of oil can be more reliably supplied to bearing sections of crank journals other than the specific crank journal. For example, when the target oil pressure is higher than the required oil pressure of the second oil supply section, oil can be prevented from being excessively supplied to the bearing sections of crank journals other than the specific crank journal by controlling the oil flow rate of the sub oil supply path.

In addition, in the oil supply apparatus described above, preferably, when the sub oil supply path is defined as a first sub oil supply path, the oil supply apparatus includes a second sub oil supply path which is connected to a downstream side of the main oil supply path and a nozzle which is the hydraulic operating section, and which is connected to the second sub oil supply path, and injects oil to a piston of the engine.

According to this configuration, oil of the main oil supply path can be guided to the second sub oil supply path and supplied to the piston as cooling oil and/or lubricating oil.

In this case, preferably, an oil control valve which controls an oil flow rate of the second sub oil supply path is provided.

According to this configuration, by controlling the oil control valve, oil supply can be turned on and off and an appropriate amount of oil can be more reliably supplied to the piston. For example, when the target oil pressure is higher than the required oil pressure of the nozzle, oil can be prevented from being excessively supplied to the piston by controlling the oil flow rate of the second sub oil supply path.

In this case, preferably, a single unit of the oil control valve which individually controls an oil flow rate of the first sub oil supply path and an oil flow rate of the second sub oil supply path is provided.

According to this configuration, a compact configuration with a consolidated oil control valve which controls the oil flow rate of the first sub oil supply path and the oil flow rate of the second sub oil supply path is achieved.

Furthermore, the oil supply apparatus described above may include: a hydraulic valve characteristic varying apparatus which is the hydraulic operating section and which varies valve characteristics of at least one of the intake valve and the exhaust valve of the engine by a hydraulic operation in accordance with an operation state of the engine; a hydraulic lash adjuster for maintaining a valve clearance of a valve drive mechanism at zero; and a third oil supply section which supplies oil to a lubricated section of the valve drive mechanism using oil pressure of the oil, wherein the hydraulic valve characteristic varying apparatus communicates with the main oil supply path, and the hydraulic lash adjuster and the third oil supply section communicate with the first sub oil supply path.

According to this configuration, appropriate amounts of oil can be supplied to the hydraulic lash adjuster and the lubricated section of the valve drive mechanism while favorably securing operational responsiveness of the hydraulic valve characteristic varying apparatus.

The invention claimed is:

1. An engine oil supply apparatus which is provided with a crank shaft including a plurality of crank journals and in which oil is introduced to inside of the crank shaft from a specific crank journal from among the plurality of crank journals and the oil is supplied to a crank pin through an inside passage formed in the crank shaft, comprising:
   an oil pump which is capable of controlling a discharge amount;
   a main oil supply path into which oil discharged from the oil pump is introduced;

a first sub oil supply path which is connected to a downstream side of the main oil supply path in an oil flow direction;

a first oil supply section which is connected to the mail oil supply path and which supplies oil to a crank bearing section of the specific crank journal from among the plurality of crank journals;

a second oil supply section which is connected to the sub oil supply path and which supplies oil to a crank bearing section of the crank journal other than the specific crank journal;

a plurality of hydraulic operating sections which include at least the first oil supply section and the second oil supply section;

an oil pressure sensor which detects an oil pressure of the main oil supply path;

a control apparatus which sets, as a target oil pressure, a highest required oil pressure among required oil pressures required from the plurality of hydraulic operating sections in accordance with an operation state of the engine, and which controls the discharge amount of the oil pump so that the oil pressure detected by the oil pressure sensor equals the target oil pressure;

a second sub oil supply path which is connected to a downstream side of the main oil supply path;

a nozzle which is the hydraulic operating section, and which is connected to the second sub oil supply path, and injects oil to a piston of the engine;

an oil control valve which controls an oil flow rate of the second sub oil supply path; and a single unit of the oil control valve which individually controls an oil flow rate of the first sub oil supply path and an oil flow rate of the second sub oil supply path.

2. An engine oil supply apparatus which is provided with a crank shaft including a plurality of crank journals and in which oil is introduced to inside of the crank shaft from a specific crank journal from among the plurality of crank journals and the oil is supplied to a crank pin through an inside passage formed in the crank shaft, comprising:

an oil pump which is capable of controlling a discharge amount;

a main oil supply path into which oil discharged from the oil pump is introduced;

a sub oil supply path which is connected to a downstream side of the main oil supply path in an oil flow direction;

a first oil supply section which is connected to the main oil supply path and which supplies oil to a crank bearing section of the specific crank journal from among the plurality of crank journals;

a second oil supply section which is connected to the sub oil supply path and which supplies oil to a crank bearing section of the crank journal other than the specific crank journal;

a plurality of hydraulic operating sections which include at least the first oil supply section and the second oil supply section;

an oil pressure sensor which detects an oil pressure of the main oil supply path; and a control apparatus which sets, as a target oil pressure, a highest required oil pressure among required oil pressures required from the plurality of hydraulic operating sections in accordance with an operation state of the engine, and which controls the discharge amount of the oil pump so that the oil pressure detected by the oil pressure sensor equals the target oil pressure, wherein the engine is provided with a valve drive mechanism which operates an intake valve and an exhaust valve, the engine oil supply apparatus further comprising: a hydraulic valve characteristic varying apparatus which is the hydraulic operating section and which varies valve characteristics of at least one of the intake valve and the exhaust valve of the engine by a hydraulic operation in accordance with an operation state of the engine; a hydraulic lash adjuster for maintaining a valve clearance of the valve drive mechanism at zero; and a third oil supply section which supplies oil to a lubricated section of the valve drive mechanism using oil pressure of the oil, the hydraulic valve characteristic varying apparatus communicates with the main oil supply path, and the hydraulic lash adjuster and the third oil supply section communicate with the first sub oil supply path.

3. The engine oil supply apparatus according to claim 2, further comprising an oil control valve which controls an oil flow rate of the sub oil supply path.

4. The engine oil supply apparatus according to claim 2, wherein when the sub oil supply path is defined as a first sub oil supply path, the oil supply apparatus comprises a second sub oil supply path which is connected to a downstream side of the main oil supply path, and a nozzle which is the hydraulic operating section, and which is connected to the second sub oil supply path, and injects oil to a piston of the engine.

5. The engine oil supply apparatus according to claim 4, further comprising an oil control valve which controls an oil flow rate of the second sub oil supply path.

6. The engine oil supply apparatus according to claim 5, further comprising a single unit of the oil control valve which individually controls an oil flow rate of the first sub oil supply path and an oil flow rate of the second sub oil supply path.

* * * * *